Aug. 7, 1923. 1,464,425
W. E. HEDGER
SAFETY VALVE AND PRESSURE INDICATOR FOR AUTOMOBILE TIRES
Filed April 11, 1922
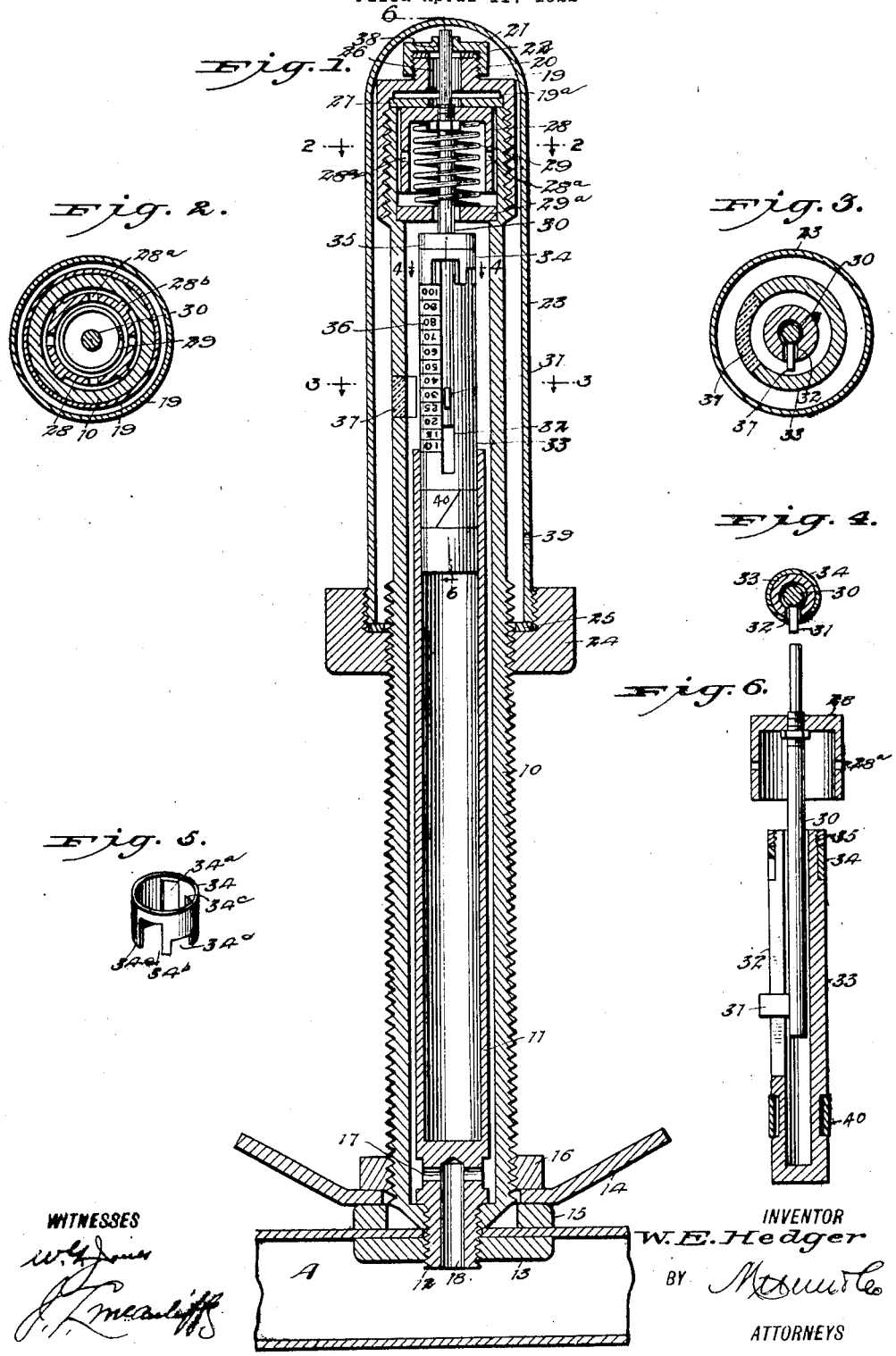
WITNESSES
INVENTOR
W. E. Hedger
BY
ATTORNEYS Patented Aug. 7, 1923.

1,464,425

UNITED STATES PATENT OFFICE.

WARD E. HEDGER, OF WAUPUN, WISCONSIN.

SAFETY VALVE AND PRESSURE INDICATOR FOR AUTOMOBILE TIRES.

Application filed April 11, 1922. Serial No. 551,618.

*To all whom it may concern:*

Be it known that I, WARD E. HEDGER, a citizen of the United States, and a resident of Waupun, in the county of Fond du Lac and State of Wisconsin, have invented a new and Improved Safety Valve and Pressure Indicator for Automobile Tires, of which the following is a description.

My invention relates to the air valve for the inner tubes of tires and the general object of the invention is to provide a tire valve having a novel assemblage functioning as a pressure indicator in the pumping up of the tire and functioning as a safety valve for the relief of undue pressure under excessive heating of the tire.

The means by which the above and other objects are attained as well as the distinctive features of the invention and its advantages will clearly appear as the description proceeds.

Reference is to be had to the accompanying drawings forming a part of this specification, it being understood that the drawings are merely illustrative of one example of the invention.

Figure 1 is a longitudinal section of a tire valve embodying my invention;

Figures 2 and 3 are cross sections respectively on the lines 2—2 and 3—3, Figure 1;

Figure 4 is a detail in horizontal section as indicated by the line 4—4, Figure 1;

Figure 5 is a perspective view of a member entering into the safety valve assemblage;

Figure 6 is a detail in longitudinal section as indicated by the line 6—6, Figure 1.

In carrying out my invention in accordance with the illustrated example a tubular valve body 10 accommodates within the same a tubular element 11 here shown as having a nipple 12 secured to the inner tube A by a nut 13 within the tube, the valve having the usual base element 14 clamped between a nut 16 on the body 10 and a collar 15 lying against the outer surface of the tube A. The inner element 11 has transverse air passages 17 establishing communication between the axial bore 18 of the nipple 12 and the air chamber between the body 10 and the said element 11.

On the outer end of the body 10 is a cap 19 having a nipple 20 receiving the cap 21 within which is a gasket 22. Over the whole fits the dust cap 23 threaded to a nut 24 on the body 10 and having a gasket 25.

The nipple 20 presents a bore 26 registering with the central bore of a valve seat 27 adapted to seat the valve 28 which is under the pressure of a spring 29 coiled about the valve stem 30, said spring seating at its inner end against disk $29^a$ within the body 10.

The valve stem 30 has a lateral member 31 afforded clearance in a longitudinal slot 32 in a plunger sleeve 33 loose on said stem, said sleeve telescoping in the tube 11. On the sleeve 33 at the outer end is a ring 34 and washer 35 adapted to have longitudinal movement with said sleeve longitudinally of stem 30 under excessive pressure as hereinafter referred to so that the said ring 34 will finally engage the member 31 on the valve stem 30 for opening the valve 28. The ring 34 is adapted to variously engage and trip the member 31 and thereby trip the stem 30 of the valve 28 for opening said valve according to the degree of pressure it is desired to retain for which purpose said ring 34 has notches $34^a$, $34^b$, $34^c$ and $34^d$ of various depths extending from the forward edge $34^e$ of the ring. The plunger sleeve 33 has graduations 36 indicating different pressures in coaction with indicating member 31. A sight glass 37 is provided in the body 10 in the transverse plane of the normal position of the member 31. The bore 38 of the cap 21 affords escape of air when the valve stem 30 is forced inwardly by the ring 34, the air passing to the interior of the dust cap 23 and being permitted escape through an air outlet hole 39 in said dust cap, or other equivalent air escape.

The valve 28 has air holes $28^a$ to permit a free flow of the air when the valve contacts at its lower edge against the seat $29^a$. Also, said valve has vertical ribs $28^b$ at the exterior to afford air passages therebetween.

With the above described construction when it is desired to pump up the tube A the cap 21 is removed and a connection as usual established between the pump hose and the nipple 20. Air from the pump will enter through the bore 26 and valve seat 27 and unseat the valve 28 thereby permitting air to pass through the central bore of the partition $29^a$ to the interior of the body 10. As the pressure in the tube A and therefore in body 10 exceeds the predetermined degree the pressure will be effective on the washer 35 and ring 34, thereby moving said ring forwardly, the ring thereby moving the plunger sleeve 33, the valve stem 30 and its trip member 31 remaining stationary. The movement of the plunger sleeve 33 into the tube 11 will increasingly compress the air in said tube, said plunger having a packing ring 40 and a closed lower end. The pressure thus produced will be registered on the scale 36 and indicating member 31, the indicated pressure being sighted through the glass 37.

When the valve has been pumped up and the caps 21 and 23 are emplaced, should the pressure in the inner tube A increase excessively under heating of the tire, the increased pressure will be registered in the body 10 and the trip ring 34 will move forwardly until the trip 31 is engaged, the valve stem moving out of the bore 26 in cap 21 and unseating valve 28 from seat 27, thereby permittting the air to escape from the tire through the bore 18, passages 17, body 10, past the valve 28, through the bore 38 which now is clear of the stem 30 and out through the air escape 39.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:—

1. A tire valve including a body, an air tube within the body and extending from an end thereof, a sleeve movable longitudinally relatively to said air tube and bearing indicating means, a valve controlling the outer end of the body, the stem of the valve extending into said sleeve and having an indicating element thereon to coact with the indicating means on the sleeve, and a trip element movable with the sleeve and subject to excessive pressure in the body to move forwardly and engage said trip member on the stem for moving the stem and unseating said valve.

2. A tire valve including a body, an air tube within the body and extending from an end thereof, a sleeve movable longitudinally relatively to said air tube and bearing indicating means, a valve controlling the outer end of the body, the stem of the valve extending into said sleeve and having an indicating element thereon to coact with the indicating means on the sleeve, and a trip element movable with the sleeve and subject to excessive pressure in the body to move forwardly and engage said trip member on the stem for moving the stem and unseating said valve, said trip element presenting various notches in its forward edge whereby the trip may be adjusted to variously engage the member on the stem.

3. A tire valve including a body, a tube within the body, said tube adapted at its forward end to enter the inner tube of a tire and having passages at said forward end in communication with the interior of the body so that the body will be subject to the pressure in the inner tube, a valve on said stem controlling outlet of air from the body, an indicating element movable in the first tube under excessive pressure in the body, means on said element to trip the valve stem, and a cap covering the body and having an air outlet for the escape of air when said valve is opened by the tripping of the stem.

4. A tire valve including a valve body, means to subject the interior of the body to tire pressure, a valve controlling the escape of air from the body, a plunger sleeve on the stem of the valve, a tube into which the plunger sleeve may move under the pressure to compress the air in said tube, and means to register the movement of the plunger sleeve into the tube and thereby register the pressure.

5. A tire valve including a valve body, means to subject the interior of the body to tire pressure, a valve controlling the escape of air from the body, a plunger sleeve on the stem of the valve, a tube into which the plunger sleeve may move under the pressure to compress the air in said tube, and means to register the movement of the plunger sleeve into the tube and thereby register the pressure; together with means to cause the opening of said valve by a predetermined movement of said plunger sleeve.

6. A tire valve including a valve body, means to subject the interior of the body to tire pressure, a valve controlling the escape of air from the body, a plunger on the stem of the valve, a tube into which the plunger may move under the pressure to compress the air in said tube, and means to register the movement of the plunger into the tube and thereby register the pressure.

7. In a tire valve, a valve body communicating with the pressure within the tire, valve means governing the escape of air from said valve body, a pressure cylinder arranged within the valve body, a piston fitted in the cylinder and movable into the cylinder under the action of the pressure in the valve body, and a connection between the piston and valve means.

8. In a tire valve, a valve body communicating with the pressure within the tire, valve means governing the escape of air from said valve body, a pressure cylinder arranged within the valve body, a piston fitted in the cylinder and movable into the cylinder under the action of the pressure in the valve body, and a connection between the piston and the valve means and comprising a stem carried by the valve means, and cooperating means between the stem and the piston engageable and effective to open the valve means and permit escape of air when the piston is moved into the pressure cylinder by the action of excessive pressure within the valve body.

9. In a tire valve, a valve body communicating at its inner end with the pressure within the tire, valve means at the outer end of the valve body, a pressure cylinder arranged within the valve body and having its inner end closed and carried by the inner end of the valve body, the outer end of the cylinder being open, a piston fitted in the outer open end of the cylinder and movable into the cylinder and toward the inner end of the valve body under the influence of the pressure within the valve body, said piston bearing pressure characteristics and said valve body having a sight glass whereby the pressure characteristics may be viewed.

WARD E. HEDGER.